(12) United States Patent
Wu et al.

(10) Patent No.: US 10,145,677 B2
(45) Date of Patent: Dec. 4, 2018

(54) METHOD AND APPARATUS FOR EXAMINING BRAIN INJURY DUE TO IMPACT

(71) Applicant: Villanova University, Villanova, PA (US)

(72) Inventors: Qianhong Wu, Malvern, PA (US); Kei-Peng Jen, Broomall, PA (US); Rungun Nathan, Reading, PA (US); Chris W. Townend, Media, PA (US)

(73) Assignees: Villanova University, Villanova, PA (US); The Penn State Research Foundation, University Park, PA (US)

( * ) Notice: Subject to any disclaimer, the term of this patent is extended or adjusted under 35 U.S.C. 154(b) by 244 days.

(21) Appl. No.: 15/067,795

(22) Filed: Mar. 11, 2016

(65) Prior Publication Data

US 2017/0261416 A1 Sep. 14, 2017

(51) Int. Cl.
| | |
|---|---|
| *G01B 11/16* | (2006.01) |
| *G01M 7/00* | (2006.01) |
| *G01M 7/08* | (2006.01) |
| *G09B 23/30* | (2006.01) |

(52) U.S. Cl.
CPC ............... *G01B 11/16* (2013.01); *G01M 7/00* (2013.01); *G01M 7/08* (2013.01); *G09B 23/30* (2013.01)

(58) Field of Classification Search
CPC .......... G01B 11/16; G01N 3/30; G01M 7/00; G01M 7/08; G09B 23/30
See application file for complete search history.

(56) References Cited

U.S. PATENT DOCUMENTS

| 8,556,831 | B1 * | 10/2013 | Faber | A42B 3/046 |
| | | | | 340/500 |
| 9,552,747 | B1 * | 1/2017 | Lytle | G09B 23/30 |
| 2008/0256685 | A1 * | 10/2008 | Lampe | A42B 3/068 |
| | | | | 2/411 |
| 2012/0070814 | A1 * | 3/2012 | Iida | G09B 23/286 |
| | | | | 434/270 |
| 2012/0247178 | A1 * | 10/2012 | Kis, Jr. | G01N 3/30 |
| | | | | 73/12.04 |
| 2012/0304767 | A1 * | 12/2012 | Howard | A42B 3/046 |
| | | | | 73/504.03 |

(Continued)

OTHER PUBLICATIONS

Bateman, J., "Manufacture of a prototype for functionality studies of cerebrospinal fluid", Research Experience for Undergraduates, Jun. 1-Aug. 8, 2014, 9 pages.

(Continued)

*Primary Examiner* — Francis C Gray
(74) *Attorney, Agent, or Firm* — Duane Morris LLP

(57) ABSTRACT

An impact test system includes a head model having a head exterior component; a skull component; a brain component; a fluid component; an interior cavity surface; and a translucent cover, wherein the head model is coupled with a mount, the brain component and fluid components are configured within the interior cavity, and wherein the translucent cover is configured over a portion of the brain component and fluid component. A mount is configured to a least partially restrain the head model. A camera is configured to take a plurality of images of the brain and the fluid components through the translucent cover when the head model is under an impact force.

22 Claims, 15 Drawing Sheets

(56) References Cited

U.S. PATENT DOCUMENTS

2015/0086955 A1* 3/2015 Poniatowski .......... G09B 23/28
434/267

OTHER PUBLICATIONS

Liu, Wei et al., "HARP MRI Tagging for Direct Quantification of Lagrangian Strain in Rat Hearts After Myocardial Infarction", Journal of biomechanical engineering, Aug. 2004,126(4), 523-528.

Bieszk, E., "Brain modeling to mimic functionality studies of cerebrospinal fluid", Proceedings of the National Conference on Undergraduate Research, Apr. 3-5, 2014, 6 pages.

Capek, T., "Modeling the Human Brain's Major Structures and White Matter Connectivity Using Magnetic Resonance and Diffusion Tensor Imaging", Proceedings of the National Conference on Undergraduate Research (NCUR), Apr. 11-13, 2013, 634-640.

Franceschini, G., et al., "Brain tissue deforms similarly to filled elastomers and follows consolidation theory", Journal of the Mechanics and Physics of Solids, 2006, 54(12), 2592-2620.

Furlan, J.M. et al., "CSF Flow Characterization within a Model of the Cerebral Ventricular System Using Particle Image Velocimetry", ISFV13—13th International Symposium on Flow Visualization, FLUVISU12—12th French Congress on Visualization in Fluid Mechanics, Jul. 1-4, 2008, Nice, France, 1-19.

Gevertz, J. L., & Torquato, S., "A novel three-phase model of brain tissue microstructure", PloS computational biology, Aug. 2008, 4(8), e1000152.

Greenwald, R. M., et al. "Head impact severity measures for evaluating mild traumatic brain injury risk exposure", Neurosurgery, Apr. 2008, 62(4), 789-798.

Xi, G., et al., "Mechanisms of brain injury after intracerebral haemorrhage", The Lancet Neurology, Jan. 2006, 5(1), 53-63.

Holboum, A. H. S., "Mechanics of head injuries", The Lancet, Oct. 9, 1943, 242(6267), 438-441.

Hossain, S.G.M., "Material Modeling and Analysis for the Development of Realistic Blast Headform", Theses, Aug. 2010, University of Nebraska, Lincoln, 1-125.

Sogbesan, E. A., "Design and analysis of blast induced traumatic brain injury mechanism using a surrogate headform: instrumentation and outcomes", Theses, May 2011, University of Nebraska—Lincoln Department of Mechanical Engineering, 1-103.

Ivarsson, J., et al., "Influence of the lateral ventricles and irregular skull base on brain kinematics due to sagittal plane head rotation", Journal of biomechanical engineering, Aug. 2002, 124(4), 422-431.

Kertzscher, U., et al., "In vitro study of cerebrospinal fluid dynamics in a shaken basal cistern after experimental subarachnoid hemorrhage", PloS one, Aug. 2012, 7(8), e41677.

Linge, S.O., et al., "CSF flow dynamics at the craniovertebral junction studied with an idealized model of the subarachnoid space and computational flow analysis", American Journal of Neuroradiology, Jan. 2010, 31(1), 185-192.

Margulies, S.S., et al., "Physical model simulations of brain injury in the primate", Journal of biomechanics, 1990, 23(8), 823-836.

Meaney, D. F., et al., "The mechanics of traumatic brain injury: a review of what we know and what we need to know for reducing its societal burden", Journal of biomechanical engineering, Feb. 2014, 136(2), 021008.

Jurjević, I., et al., "Physical Characteristics in the New Model of the Cerebrospinal Fluid System", Coll. Antropol., 2011, 35, Suppl. 1: 51-56.

Mehrabian, A., et al., "Dual-porosity poroviscoelasticity and quantitative hydromechanical characterization of the brain tissue with experimental hydrocephalus data", Journal of theoretical biology, 2015, 384,19-32.

Nicholson, C., "Diffusion and related transport mechanisms in brain tissue", Reports on progress in Physics, 2001, 64(7), 815.

Shafieian, M., et al., "Development of a constitutive model for brain tissue under multiaxial loading", In Proceedings of the 2012 International IRCOBI Conference on the Biomechanics of Injury, Sep. 2012, 467-473.

Tawse, K. L., et al. "Cerbrospinal Fluid-tissue Interactions in the Human Brain", Doctoral dissertation, Pennsylvania State University, Jun. 5, 2006, 1-13.

Crawford, R. et al., "Compression-dependent permeability measurement for random soft porous media and its implications to lift generation", Chemical Engineering Science, 2011, vol. 66, pp. 294-302.

Crawford, R. et al., "Experimental study on the lift generation inside a random synthetic porous layer under rapid compaction", Experimental Thermal and Fluid Science, 2012, vol. 36, pp. 205-216.

Crawford, R. et al., "Dynamic Compression of Soft Porous Media: From Finite to Infinite Domain", Journal of Porous Media, Jan. 2011, vol. 14, No. 1, pp. 51-64.

Wu, Q. et al., "On the Characterization of Lifting Forces During the Rapid Compaction of Deformable Porous Media", Journal of Heat Transfer, Oct. 2009, vol. 131, 101006/1-12.

Wu, Q. et al., "Dynamic compression of highly compressible porous media with application to snow compaction", J. Fluid Mech., 2005, vol. 542, pp. 281-304.

Foster, J. K. et al., "Hybrid III—A Biomechanically-Based Crash Test Dummy", SAE Technical Paper, Feb. 1, 1977, pp. 3268-3283.

Ivarsson, J. et al., "Strain relief from the cerebral ventricles during head impact: experimental studies on natural protection of the brain", Journal of Biomechanics, Feb. 2000, 33(2), pp. 181-189.

Stalnaker, R. L. et al., "Head Impact Response", SAE Technical Paper, Feb. 1, 1977, pp. 3156-3170.

* cited by examiner

METHOD AND APPARATUS FOR EXAMINING BRAIN INJURY DUE TO IMPACT

BACKGROUND OF THE INVENTION

Field of the Invention

The present invention relates to a test apparatus for measuring the effect of a head impact on the brain, inside of the skull and connections to the neck. and tests methods employing the test apparatus.

Background

Chronic traumatic encephalopathy (CTE) is a progressive degenerative disease resulting from a head trauma and particularly a history of repetitive head trauma. Military personnel may be exposed to blasts and other head impacts which may lead to development of CTE. Other environments where people may be subjected to head trauma is the health care industry, industrial environments, such as in a factory or construction site, and commercial industries. Athletes participating in contact sports such as football, soccer, rugby and boxing incur repetitive head trauma that has been shown to lead to the development of CTE in some individuals. CTE may result from symptomatic concussions as well as sub-concussive head trauma. Many athletes may experience frequency sub-concussive head trauma during participation in a contact sport and never have a symptomatic concussion. These athletes may still develop CTE however and the effects of these frequent head impacts is a growing concern.

CTE may result from repetitive damage to axons in the brain, such as shearing caused by high acceleration of the brain tissue. High acceleration is caused by rapid head velocity change, such as that caused by an impact to the head. Axons connect neurons in the brain. Damage to the axons can result in immediate effects and/or delayed effects, such as CTE. Brain injury, such as axonal shearing, may create neurochemical and neurometabolic cascade effects. Even mild trauma to the brain can result in neuronal depolarization which leads to neuronal discharge and the release of neurotransmitters and increased extra cellular potassium ($K^+$). This may be followed by an increased glucose demand and metabolism (hyperglycolysis) and a resultant relative ischemia from reduced cerebral blood flow. Axonal injury may also result from an influx of extra cellular calcium that reduces cerebral blood flow through vasoconstriction, and the release of oxygen free radicals. These neurochemical and neurometabolic effects from even mild head trauma, may result in the development of CTE.

SUMMARY OF THE INVENTION

An impact test system includes a head model having a head exterior component; a skull component; a brain component; a fluid component; an interior cavity surface; and a translucent cover, wherein the head model is coupled with a mount, the brain component and fluid components are configured within the interior cavity, and wherein the translucent cover is configured over a portion of the brain component and fluid component. A mount is configured to a least partially restrain the head model. A camera is configured to take a plurality of images of the brain and the fluid components through the translucent cover when the head model is under an impact force.

A method of impact testing using the impact test system includes the steps of: actuating an impact element to provide the impact force; taking a plurality of images with the camera before, during and after the impact force on the head model; and analyzing the plurality of images to determine at least one motion factor of the brain component. A head model for use in impact testing is also provided, including: a head exterior component; a skull component; a brain component; a fluid component; an interior cavity surface; and a translucent cover, wherein the head model is coupled with a mount, wherein the brain component and fluid components are configured within the interior cavity, and wherein the translucent cover is configured over a portion of the brain component and fluid component.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

The accompanying drawings are included to provide a further understanding of the invention and are incorporated in and constitute a part of this specification, illustrate embodiments of the invention, and together with the description serve to explain the principles of the invention.

DETAILED DESCRIPTION

Figure 1:
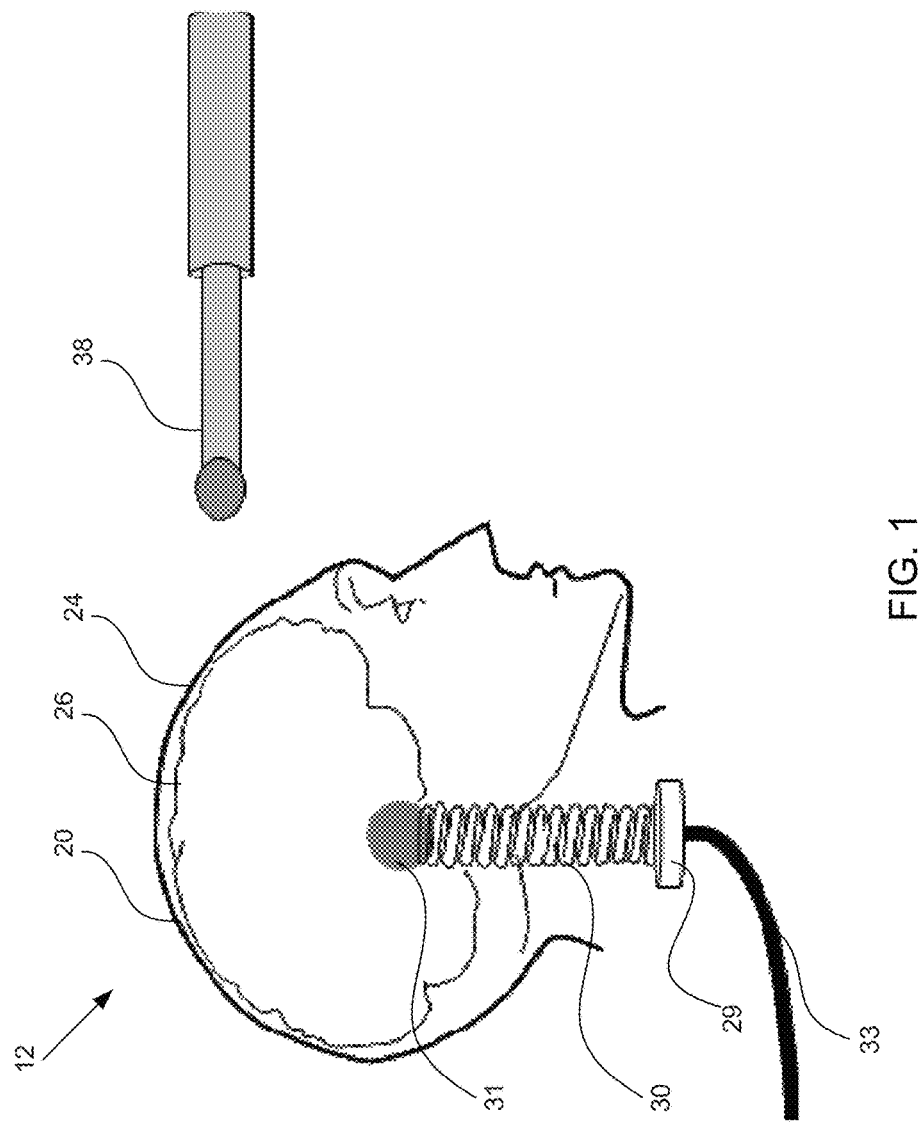
FIG. 1 shows an exemplary head impact simulator comprising a head model and an impact element configured to strike the head model.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments are described herein and are illustrated in the accompanying figures. The embodiments described are only for purposes of illustration and should not be interpreted as limiting the scope of the invention. Other embodiments, and certain modifications, combinations and improvements of the described embodiments, will occur to those skilled in the art and all such alternate embodiments, combinations, modifications, improvements are within the scope of these embodiments.

There are a wide number of test methods that measure the forces and acceleration effects and benefits of wearing a protective device, such as a helmet, however none of these methods employ a simulated head model including a brain portion. There is a need to measure the direct effects of head impact on the brain in an effort to develop protective head gear that will reduce brain acceleration and trauma or more generally to study the real-time effects of impacts (whether from direct impacts (e.g., impacts from participation in sports), rapid decelerations (e.g., as in a car crash) or other traumatic event) on the brain.

Embodiments described relate to an impact simulator and a method of use. The impact simulator includes a head model and an impact element configured to impact the head model. The impact test may be conducted with or without a sample component that is undergoing tests, such as a helmet or other protective gear, disposed over the head model. The head model is configured with a translucent cover on the imaging side(s) of the head model to enable a camera(s) to take a plurality of images of the head model as it is impacted or otherwise under the effects of an impact force (e.g., as with a crash test dummy in a test vehicle). The plurality of images may be analyzed to determine a motion factor, such as velocity or acceleration of the brain component and/or deformation of the brain component and predict a level of brain trauma. The impact simulator may be used to determine the effectiveness of various samples for preventing brain trauma or more generally for studying impacts on the brain.

A head model may be a complete head model and in an exemplary embodiment, is a cross-sectional model of a person's head. A cross-sectional head model may be a cross-section from the front to the back of the head and thereby be a model of the left or right side of a head. In another embodiment, a head model is a cross-sectional from left to right and thereby be a model of the front or back portion of a head. Any suitable cross-section portion of a head may be used, including a cross-section of the top or bottom portion of a head.

An exemplary head model comprises a head exterior component, an interior cavity, a skull component, a brain component, a fluid component, an interior cavity surface and a translucent cover. The head model may comprise real anatomical components or components configured to simulate the real anatomy. For example, the brain component may be made out of a material that has a similar density and elasticity as a real brain including, but not limited to, an elastomer, such as silicone or urethane, and may be a foam material, polymeric materials including any suitable plastic, gel material, composite material and the like. Similarly, the fluid component may comprise a fluid that has similar viscosity to cerebrospinal fluid. The brain component is configured within the interior cavity of the skull component and is adjacent to a translucent cover on an imaging side of the head model. A transparent cover may be a transparent panel that extends across and is attached to the skull component.

The head model may be coupled to a mount to restrain and provide stability during an impact test. A neck spring may couple the head model to a mount and may be flexible to enable some deflection and movement of the head model during an impact test. A neck spring may be made out of a flexible material that can be physically returned to an original orientation. In another embodiment, a neck spring is elastic and will return to substantially to an original orientation automatically. A neck spring may comprise one or more springs. The impact element may be configured to impact the head model and then quickly retract, thereby allowing the head model to spring back or recoil from the impact. This simulates real world impacts or accelerations, such as a rear-end car accident.

An impact element may be configured to simulate any number of different types of impact surfaces and orientations. For example, an impact element may comprise or simulate concrete, the ground, metal, a bat, a ball, a vehicle, a person's head (e.g., to simulate a head impact during a soccer game), or other impact element. The impact element can be precisely controlled by an actuator to provide consistent impacts on the simulated head model, the consistent impacts having consistent physical parameters, including but not limited to impact velocity and/or acceleration. The actuator may be controlled to move the impact element at any suitable velocity and/or acceleration throughout the stroke or travel distance of the impact element. As described herein, the impact element may be controlled to retract back quickly after providing the impact for directly or indirectly to the head model. An impact simulator may comprise one, two or more impact elements configured to impact the head model at substantially the same time, or in rapid succession, for example, or at different locations.

In an exemplary embodiment, an impact simulator comprises a high-speed camera configured to take a plurality of images of the brain component through the translucent cover. The plurality of images taken by the camera may be analyzed by a computer having a computer program for image analysis to determine the motion (e.g., displacement, velocity, and/or acceleration) and deformation of the brain component.

In one embodiment, the brain component comprises an outline pattern around the perimeter and the computer program detects this outline in the plurality of images and calculates the surface area of the brain component as a function of time. The rate of change of surface area may correlate with deformation, and/or compression, of the brain component. In another embodiment, a brain component comprises a grid pattern and the computer program detects the grid pattern as well as changes in the grid pattern as a function of time. The changes in discrete grids, or cells, in the pattern may correlate with acceleration and/or deformation of the brain component. Finite element analysis may be employed in conjunction with a pattern, particularly a grid pattern, to determine forces exerted on the brain component. In another embodiment, the brain component comprises an outline pattern of two or more brain portions. A brain portion of a brain component may include a frontal lobe, parietal lobe, occipital lobe, cerebellum and/or temporal lobe. The outline pattern around each of the brain portions may be recognized by the computer program and acceleration, forces, and/or deformation of each portion may be determined by image analysis. The brain portions may be different colors or have different patterns to further enable differentiation by the computer program.

Digital sensors for taking measurements of an impact event to the head model are employed in the head impact test simulator, as described herein. Accelerometers and stress-strain gauges may be configured on any portion of the head model, such as the brain component and/or the skull component, to take readings during an impact event. These readings, or measurements, may be taken as a function of time such that a correlation between a measurement and a visual motion factor is provided. For example, a deformation of the brain component may be correlated with a velocity and/or acceleration measurement.

An exemplary impact test apparatus may be used to conduct any number of tests to simulate an impact to a person's head. An exemplary method of impact testing comprises the steps of providing an impact test apparatus as described herein; providing an impact force with an impact element; taking a plurality of images, i.e. digital photographs; and, analyzing the plurality of images to determine a motion factor of the brain component. A motion factor may be displacement, velocity, acceleration, force, deformation and the like. The impact test may be utilized to compare the motion factors of a similar impact when different types of sample components are evaluated, a different impact element is used and/or different impact forces or conditions are applied.

As shown in FIG. 1, an exemplary embodiment of a head impact simulator 12 includes a head model 20 and an impact element 38 configured to strike the head model 20. The impact element 38 is instrumented to measure the velocity, acceleration, and impact force, for example, through an encoder, an accelerometer, and a force sensor (not shown). The head model 20 includes a simulated skull component 24, a brain component 26, and a neck component 29. The neck component 29 can include a spherical joint 31 and a neck spring 30. The neck spring 30 can include a flexible tubing extending helically along a longitudinal axis. A data and power cable 33 extends from the base of the neck component and is configured to acquire data from and/or provide power to one or more sensors. The data is provided to a data acquisition system (DAQ). The impact element 38 can include a linear compactor driven hydraulically and/or pneumatically. An interface between the impact element 38 and the data acquisition system (DAQ) can be established to provide a single source of data collection and processing.

In some embodiments, a helmet component 15 (see FIG. 5C), such as a football helmet, can be coupled to and/or placed over top of the head model 20. It should be understood that a football helmet is one example of a sample that can be tested using the impact simulator described herein. However, the impact simulator using a life-like head model, and test methodology can be used without a sample disposed on the head model, so as to allow for study of impact forces on the brain, with different samples on an impact element, or with different samples on or over the head model (e.g., lacrosse head gear, biking head gear, hats, headbands, hoods, or other samples). The apparatus and test methodology can also be used to test head or body restraints (as used, for example, in auto racing) and in embodiments the head model can be coupled to a crash test dummy for use in crash simulations. In other words, the approach and setup can be used in any incidents that involve head impact and/or injury.

Figure 2:
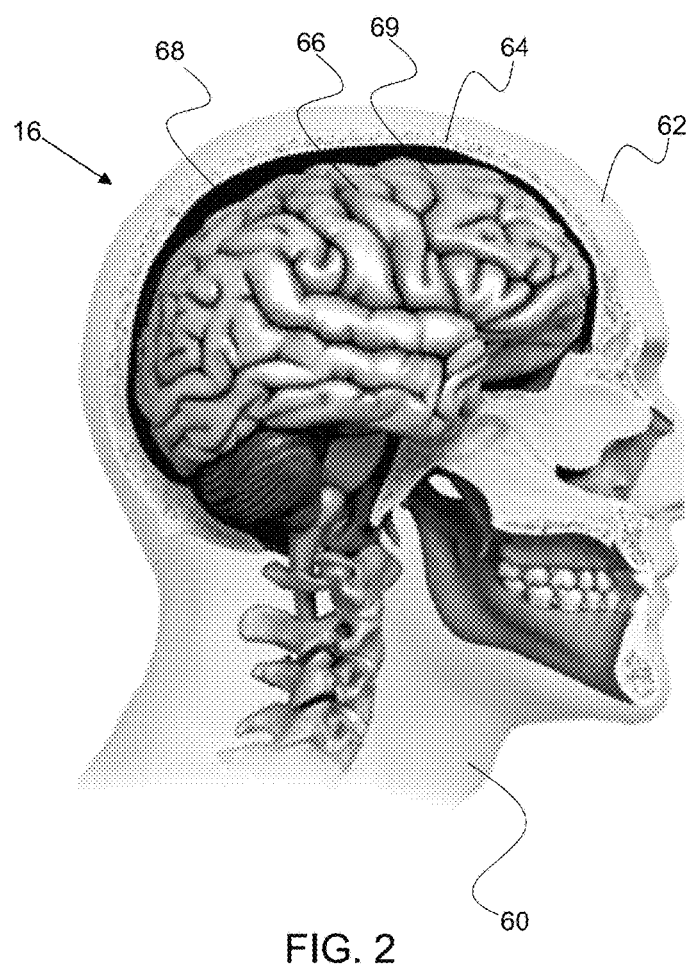
FIG. 2 shows a cross-section diagram of a person's head having the brain configured within the skull.

As shown in FIG. 2, the brain 66 is configured within the skull 64. The cerebrospinal fluid 68 surrounds the brain and is configured between the brain and skull. A head model used in the head impact simulator may utilize materials that have similar physical attributes to a person's anatomy, including the dermal tissue 62, neck 60 and dura 69.

Figure 3:
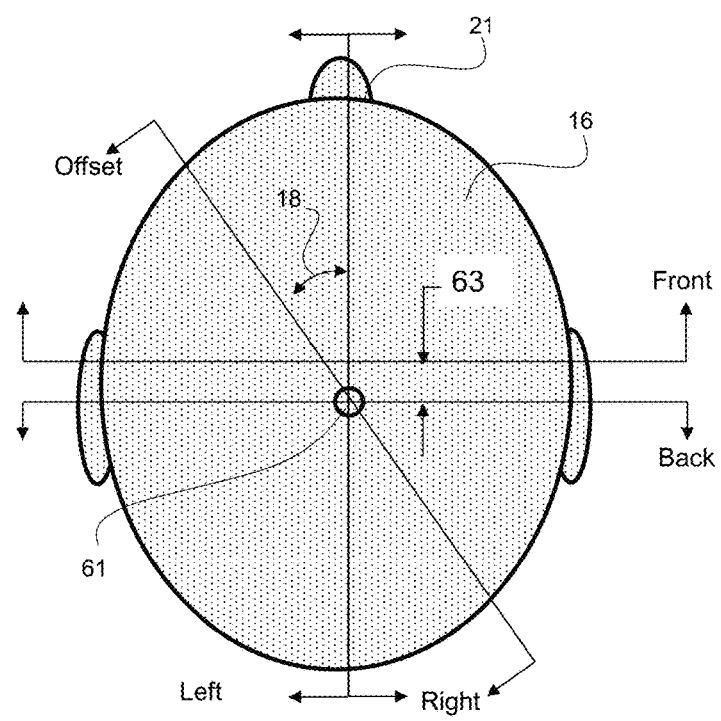
FIG. 3 shows a top-down view of a diagram of a head and cross-sectional planes that may be used in a head model.

As shown in FIG. 3, a head model may be a cross-sectional head model taken along any suitable plane of a head 16. The cross-sectional planes shown are vertical planes through the head. A cross-sectional plane may, however, be offset from a substantially vertical or horizontal plane. As shown in FIG. 3, a head model may be a left or right head model wherein the head model simulates about half of a head along a plane dividing the head from front to back. Likewise, a head model may be a front or back head model wherein the head model simulates about half of a head along a plane dividing the head from left to right. A head model may simulate about half of a person's head and extend substantially through a center point 61 of a head, or the head model may be offset an offset distance 63 from a plane extending through the center point. As shown in FIG. 3, a front cross-sectional plane is offset by offset distance 63 from a center point 61. In addition, a head model may be a model of a person's head taken along an offset angle to the front to back plane 18, as shown in FIG. 3.

In another embodiment, a head model is a full head model with components made out of a translucent material to enable viewing an image capture of the brain component. For example, a head model may be a full head model having a right side comprising a translucent head exterior component, a translucent skull component, or translucent portions thereof.

Figure 4:
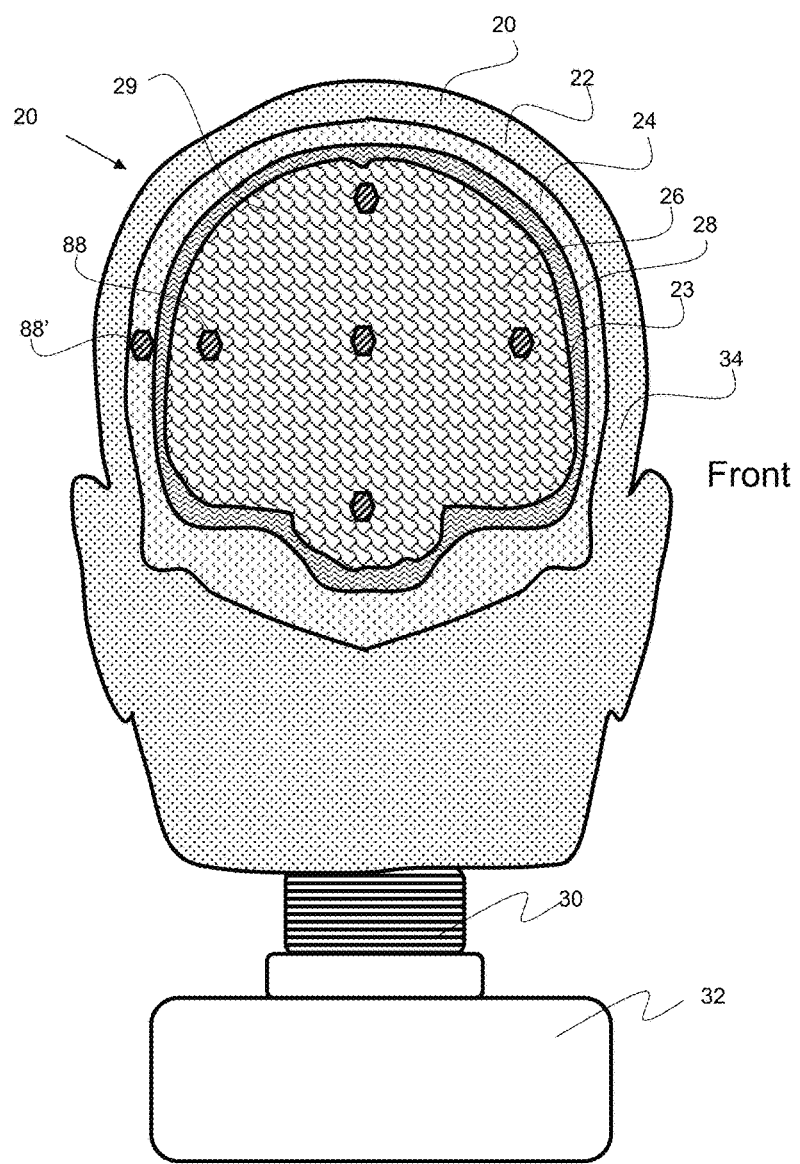
FIG. 4 shows an exemplary head model that is a cross-sectional front head model, or a head model of a front portion of a head, as shown in FIG. 3.

As shown in FIG. 4, an exemplary head model 20 is a cross-sectional front head model, or a head model of a front portion of a head, as shown in FIG. 3. A translucent cover 34 extends over the cross-sectional plane of the head model. The translucent cover enables viewing and recording of movement of the various components of the head model within the interior cavity 29. The head model includes a brain component 26 that is configured within a skull-component 24 and at least partially surrounded by a fluid component 28. The head exterior component 22 extends around the perimeter of the skull component. A plurality of sensors 88 are configured on the various components of the head model. A number of sensors are configured in various locations of the brain component and sensor 88' is configured or attached to the skull component. A sensor may be a stress-strain sensor, or force sensor, or an accelerometer or any sensor to measure velocity or acceleration. With sensors attached to the brain component and the skull component, the difference in a motion factor, velocity or acceleration, or force may be determined. The skull component may be made out of a rigid material that will measure the general motion factors of the head model and the brain component may be more supple to simulate the reaction of a real brain during an impact.

Figure 5A:
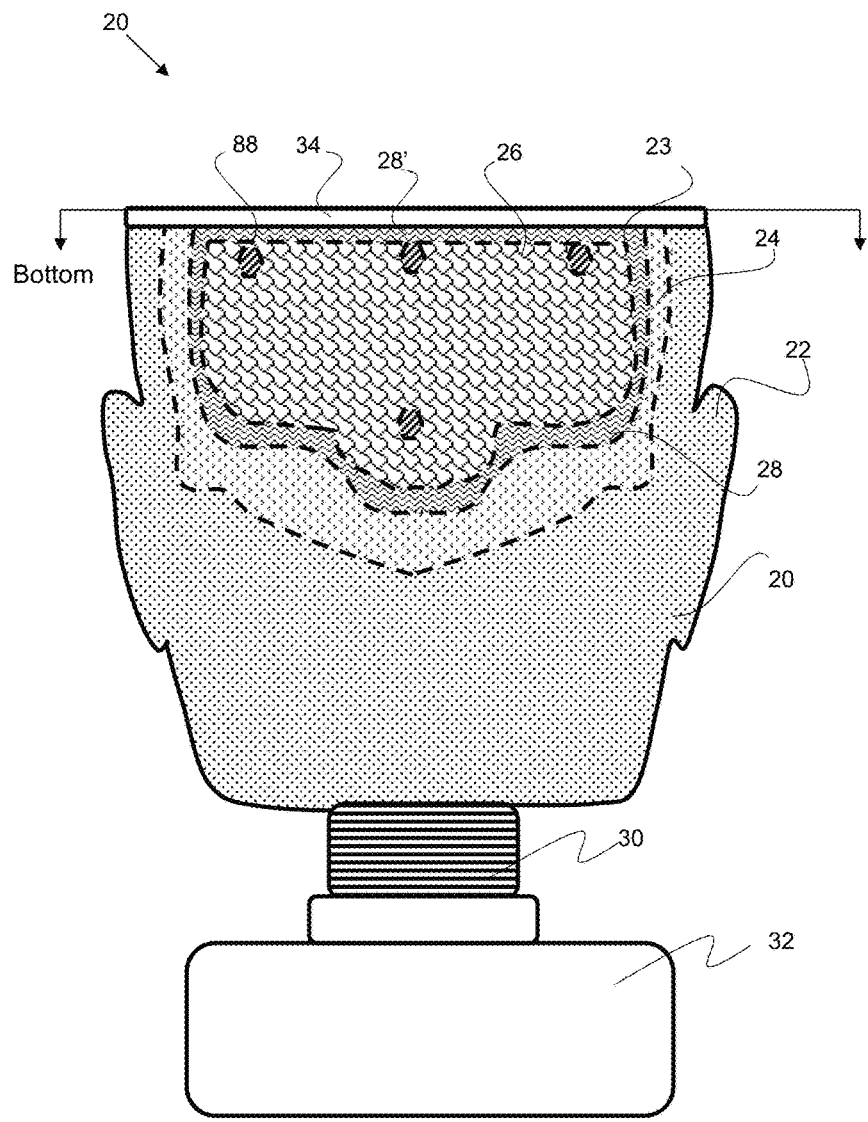
FIG. 5A is an exemplary head model that is a cross-sectional bottom head model, or a head model of a bottom portion of a head.

As shown in FIG. 5A, an exemplary head model 20 is a cross-sectional bottom head model, or a head model of a bottom portion of a head. This head model has a viewing plane through a translucent cover 34 that is oriented in a generally horizontal plane along the top of the head model. The cross-sectional head model is along a horizontal plane, allowing viewing and measuring of components of the head model in a top-down manner. A fluid component 28 completely surrounds the brain component 26 in this head model. The fluid component 28 is between the brain component 26 and the translucent cover 34.

Figure 5B:
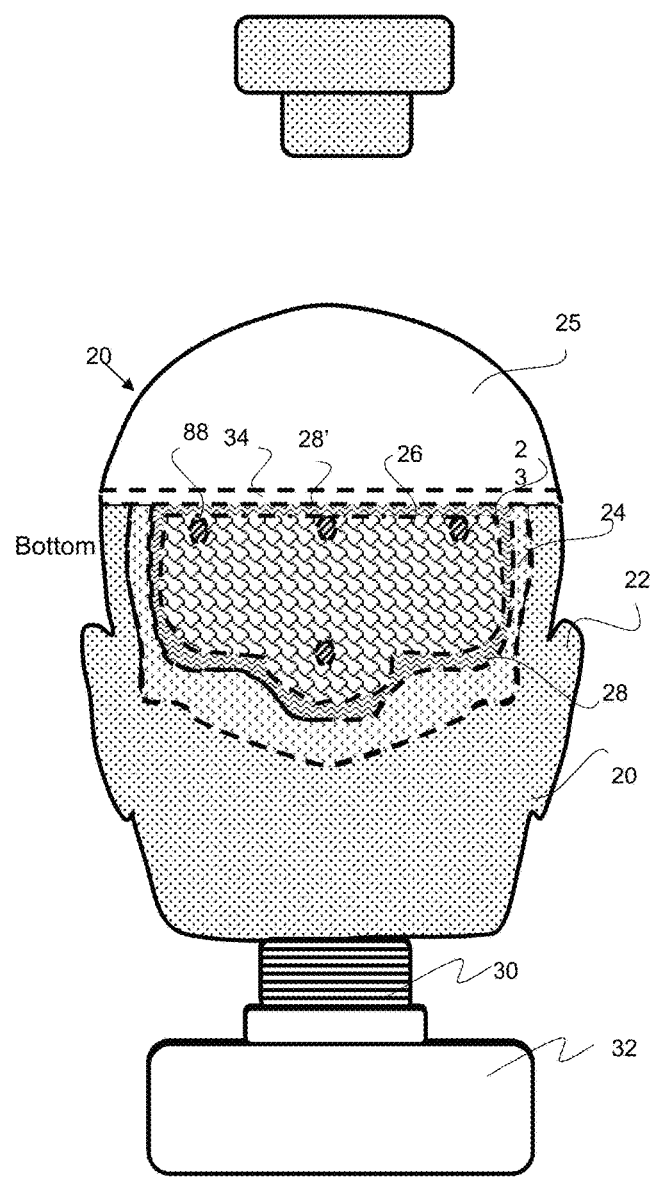
FIG. 5B is an exemplary full head model having a translucent portion configured at the top of the head model.

As shown in FIG. 5B, an exemplary head model 20 is a full head model having a translucent head portion 25. The full head model simulates an entire human head and is not cross-section, as was show in FIGS. 4 and 5A. A full head model may allow for more realistic simulations including simulations with a full helmet or other sample configured thereon. This translucent head portion, may be glass or a clear polymer, such as acrylic, urethane or silicone. A translucent head portion may be made out of a single material or a plurality of materials configured to simulate the physical properties or mechanical properties of the human anatomy. The translucent head portion enables viewing of the brain component 26, fluid component 28, and skull component 24 therethrough.

Figure 5C:
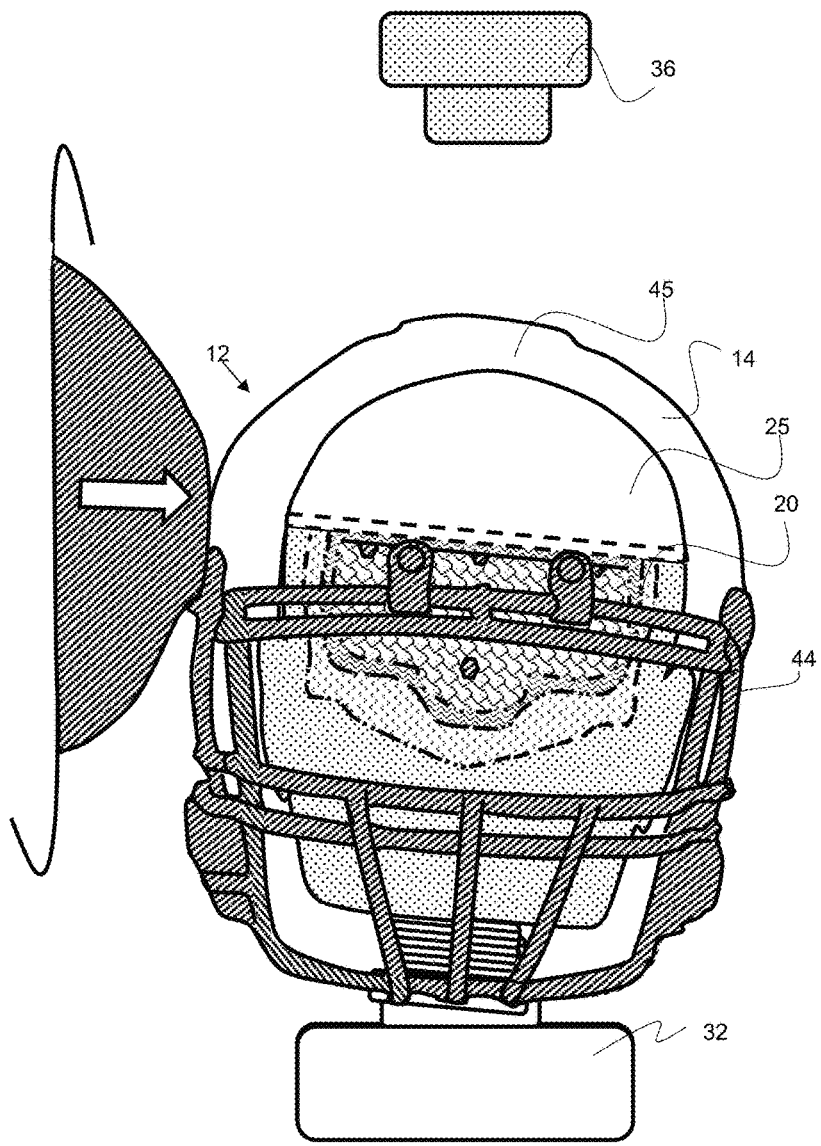
FIG. 5C is the exemplary head model shown in FIG. 5B with a full helmet configured thereon during an impact test.

As shown in FIG. 5C, as shown in FIG. 5B is configured with a full helmet thereon. The helmet 14 has a translucent helmet portion 45 that enable image capture through the translucent helmet portion 45 and a face mask 44. A translucent helmet portion may be made out of any suitable material, such as acrylic, polypropylene, polyethylene and the like. In an exemplary embodiment, the translucent helmet portion is made out of a material that substantially simulates the physical and mechanical properties of an actual helmet. As shown in FIG. 5C, a helmet impact element 35 is hitting the head model 20 from the side. The head model 20 has deflected from the impact and the camera 36 is configured to take high speed images or video of the brain component through the translucent helmet 45 component and the translucent head component 25. A helmet cover may be configured over a helmet to reduce the impact and resulting forces and acceleration on the brain. In another embodiment, a helmet 14 can include a helmet, with or without a helmet cover, that is cut in half along a cross-sectional plane.

Figure 6:
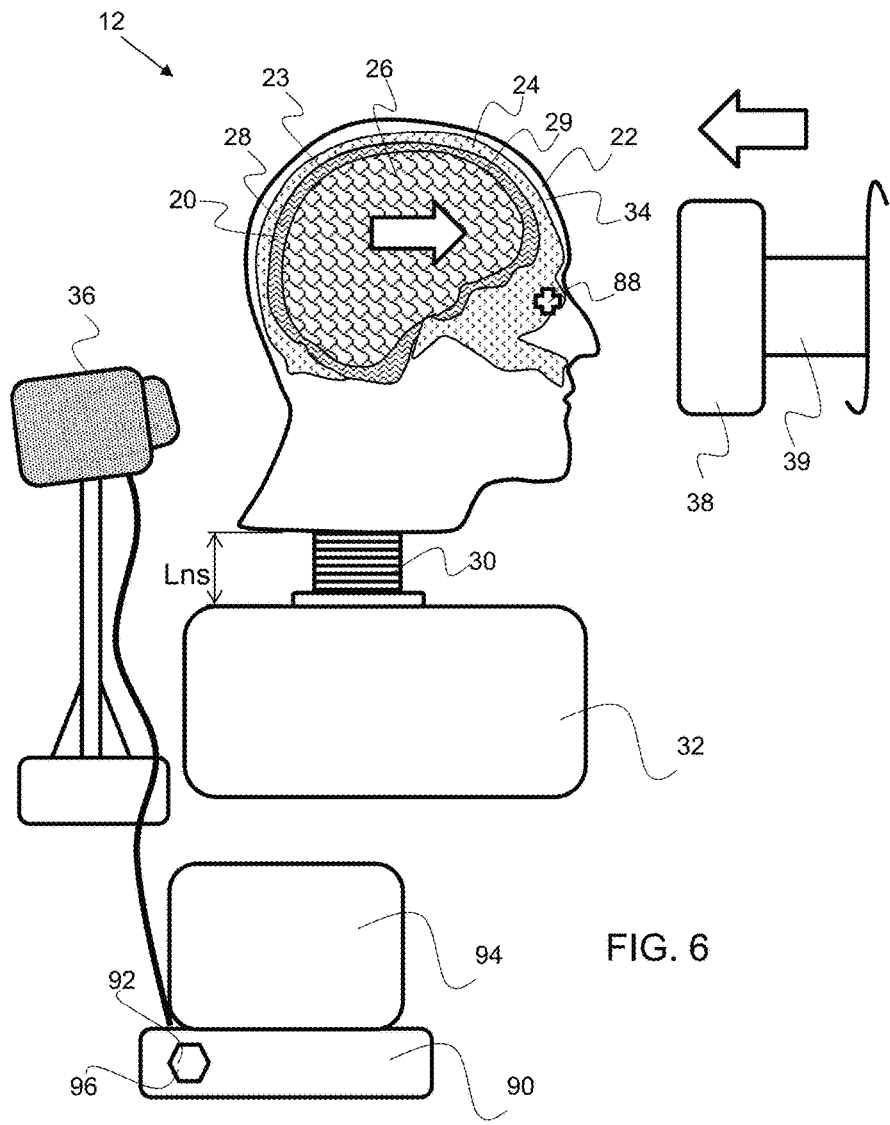
FIG. 6 shows an exemplary head impact simulator comprising a head model having a skull and brain component and an impact element configured to strike the head model.

As shown in FIG. 6, an exemplary head impact simulator 12 comprises a head model 20 having a skull component 24, brain component 26, fluid component 28, head exterior component 22, dura component 23 and an impact element 38 configured to strike the head model. A camera 36 is configured to take a plurality of images or photographs before, during and after the impact element strikes the head model.

A high speed camera may be used to provide still images for later analysis. The high speed camera and/or one or more camera parameters can be determined based on the type of impact being simulated. A transparent cover 34 is configured over the head model 20 to enable the camera to take images of the various head model components during an impact simulation. A computer 90 may be employed for analysis of the images and a computer program 92 may be processed by a microprocessor 96 to provide force, acceleration, and predicted brain trauma resulting from an impact to the head model. In addition, any number of sensors 88 may be configured on the head model or helmet component including, but not limited to, an accelerometer, stress-strain sensors, etc.

The impact element 38 may be coupled with an actuator 39 having a positioning, speed, acceleration and stroke controls. The head impact simulator may be controlled by a single computer or a plurality of computer. The head model 20 in this embodiment is coupled to a mount 32 by a neck spring 30. The neck spring may simulate a resistance to movement of the head that is representative of a person's neck (or representative of a restrained neck, e.g., in the case of use of a harness or restraint system). A neck spring may be changed in length Lns, and/or spring constant to model different scenarios. A neck spring may be flexible to allow for some deflection of the head model as a result of an impact. In another embodiment, a neck spring is elastomeric and deflects as a function of an impact and then springs back. An impact element may be configured to hit the head model and then quickly retract to allow the head model to spring back.

Figure 7A:
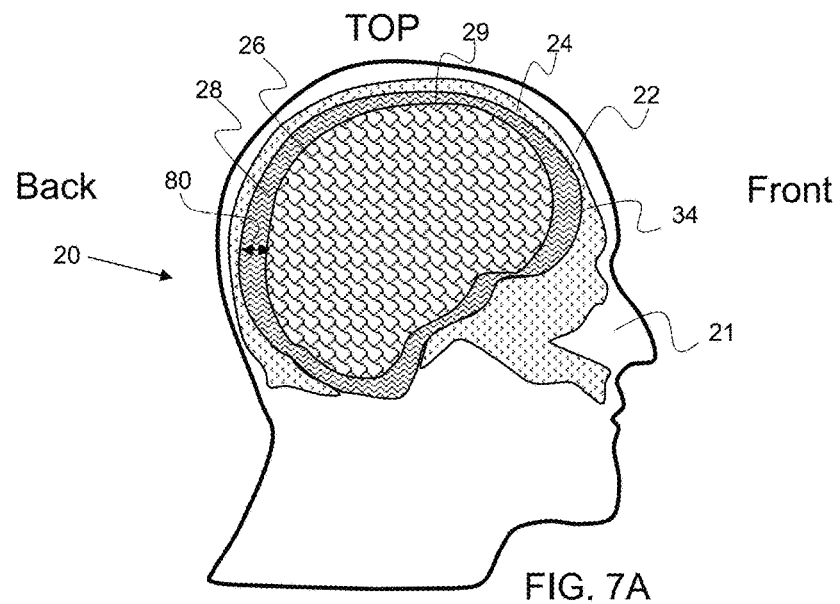
FIG. 7A shows an exemplary head model prior to impact.
Figure 7B:
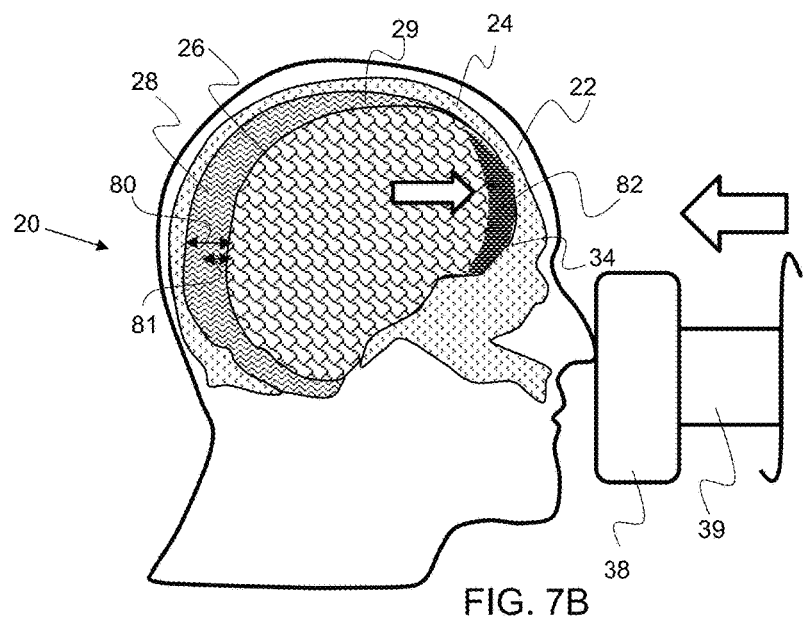
FIG. 7B shows the same head model with the brain component impacting the interior of the skull after an impact.

As shown in FIG. 7A, an exemplary head model 20 comprises a brain component within the interior cavity 29 of the skull component 24. The brain component is at least partially surrounded by a fluid component used to simulate cerebrospinal fluid. The various components of the head model may be made out of material to simulate the anatomy, having similar density, size, elasticity and the like, or may comprise real components, such as a real brain and/or skull. The head model comprises an exterior component 22 configured to simulate skin and dermal tissue, and a face component 21. As shown in FIG. 7A a distance 80 between the brain component and the skull component 24 may be measured through image analysis. As shown in FIG. 7B, the distance 80 has increased due to an impact by the impact element on the front of the head model, or face portion. The displacement 81 of the brain is the difference between distance 80 in FIG. 7B to the distance 80 in FIG. 7A. The brain component 26 has shifted forward within the interior cavity 29. The front portion of the brain component has deformed to create a deformed portion 82 resulting from the deceleration of the brain component as it is forced forward against the interior wall of the skull component 24. The acceleration of the brain component, as well as the deformation, may be captured and determined by image analysis. A high speed camera may capture a plurality of images that are analyzed by a computer program to determine force, acceleration, deformation and predict brain trauma resulting from an impact.

Figure 8:
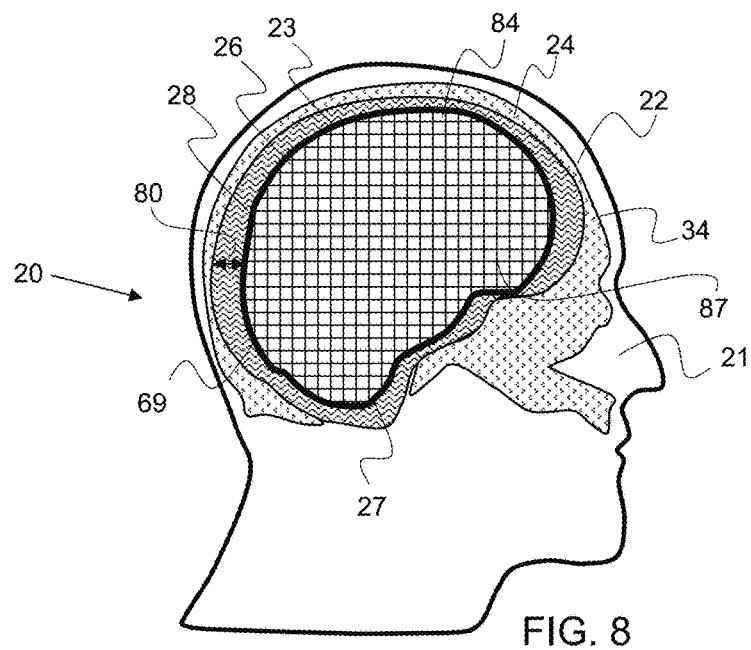
FIG. 8 shows an exemplary head model having a brain component having a pattern thereon.

As shown in FIG. 8, an exemplary head model 20 has a brain component 26 having a pattern 84 thereon. The pattern shown is a grid pattern, however any suitable pattern that enables tracking the motion and deformation of the simulated brain is used. In one embodiment, a pattern comprises one or more circles or ovals. The dura component 23, or lining around the perimeter 27 of the brain component in the image side plane 87, may be a specific thickness and color that facilitates image analysis. The overall volume of the brain component 26 may be determined by identification of the dura component by image analysis software and computation of the volume therefrom. A dura component may be transparent when configured along the imaging side of the head model.

Figure 9:
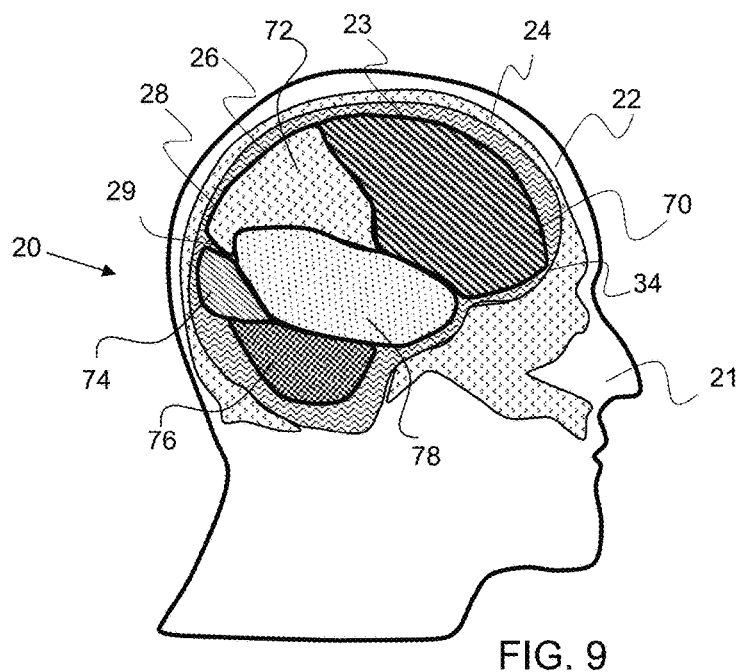
FIG. 9 shows an exemplary head model having a brain component with distinct brain portions.

As shown in FIG. 9, an exemplary head model 20 has a brain component 26 with distinct brain portions. The brain portions include the frontal lobe 70, parietal lobe 72, occipital lobe 74, cerebellum 76 and temporal lobe 78. These different brain portions may be identified by an outline pattern and different colors on the brain component 26, as shown. In an exemplary embodiment, the different brain portions may comprise different materials or materials having characteristics to simulate each distinct brain portion.

Figure 10:
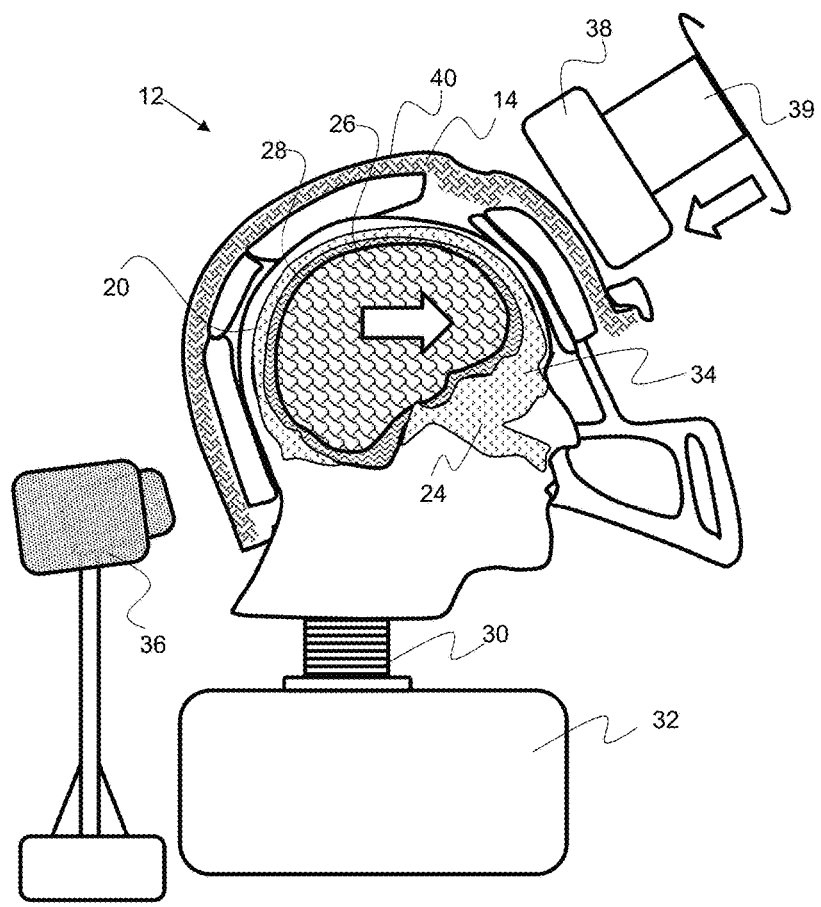
FIG. 10 shows an exemplary head impact simulator with an impact element impacting with a helmet component configured over the head model and a camera configured to take a plurality of images through a translucent cover.

As shown in FIG. 10, an exemplary head impact simulator 12 has a head model 20, configured with a helmet (or other sample) component thereon, that is being impacted by an impact element 38. The actuator is moving the impact element into contact with the helmet component 14. The helmet component does not have a helmet cover and the impact element is contacting the outer cover 40 of the helmet component. The camera 36 is configured to take photographs as the impact element strikes the head model 20.

Figure 11:
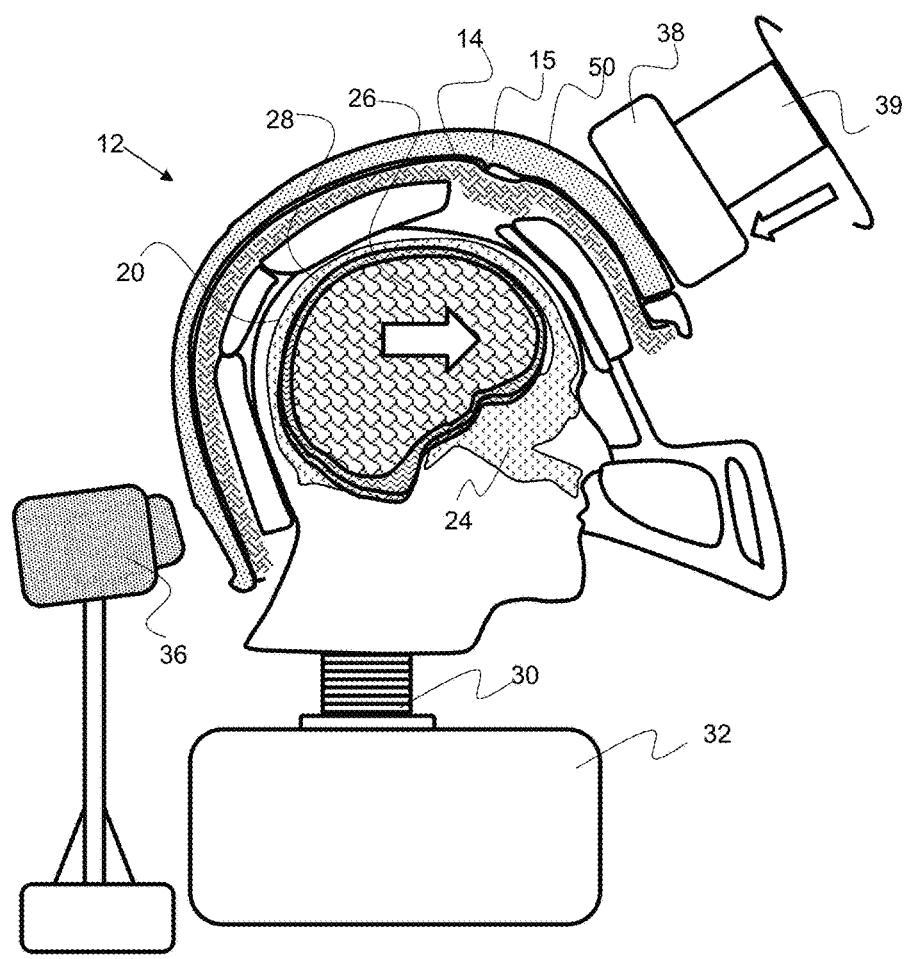
FIG. 11 shows an exemplary head impact simulator with an impact element impacting with a helmet component having a helmet cover and configured over the head model.

As shown in FIG. 11, an exemplary head impact simulator 12 has a head model 20, configured with a helmet component 14 including an outer shell 50 thereon, that is being impacted by an impact element 38. The actuator is moving the impact element into contact with the helmet component 14. The helmet component has a helmet cover 15 and the impact element is contacting the outer cover outer shell 50 of the helmet cover. Again, the camera 36 is configured to take photographs as the impact element strikes the head model 20. A comparison between the impact test shown in FIG. 10 and the impact test shown in FIG. 11 may provide useful data regarding the effectiveness of helmet covers reducing brain trauma.

Figure 12:
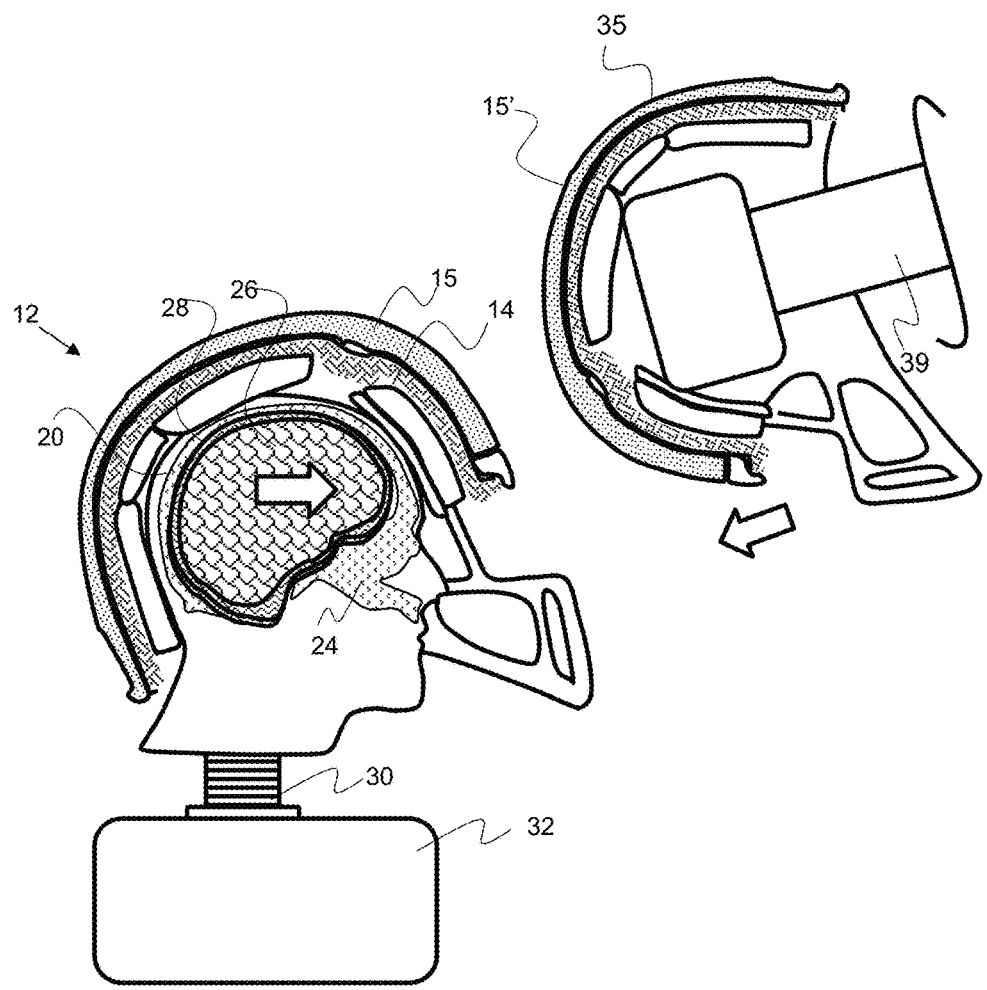
FIG. 12 shows an exemplary head impact simulator with a helmet impact element impacting with a helmet component having a helmet cover and configured over the head model.
Figure 13:
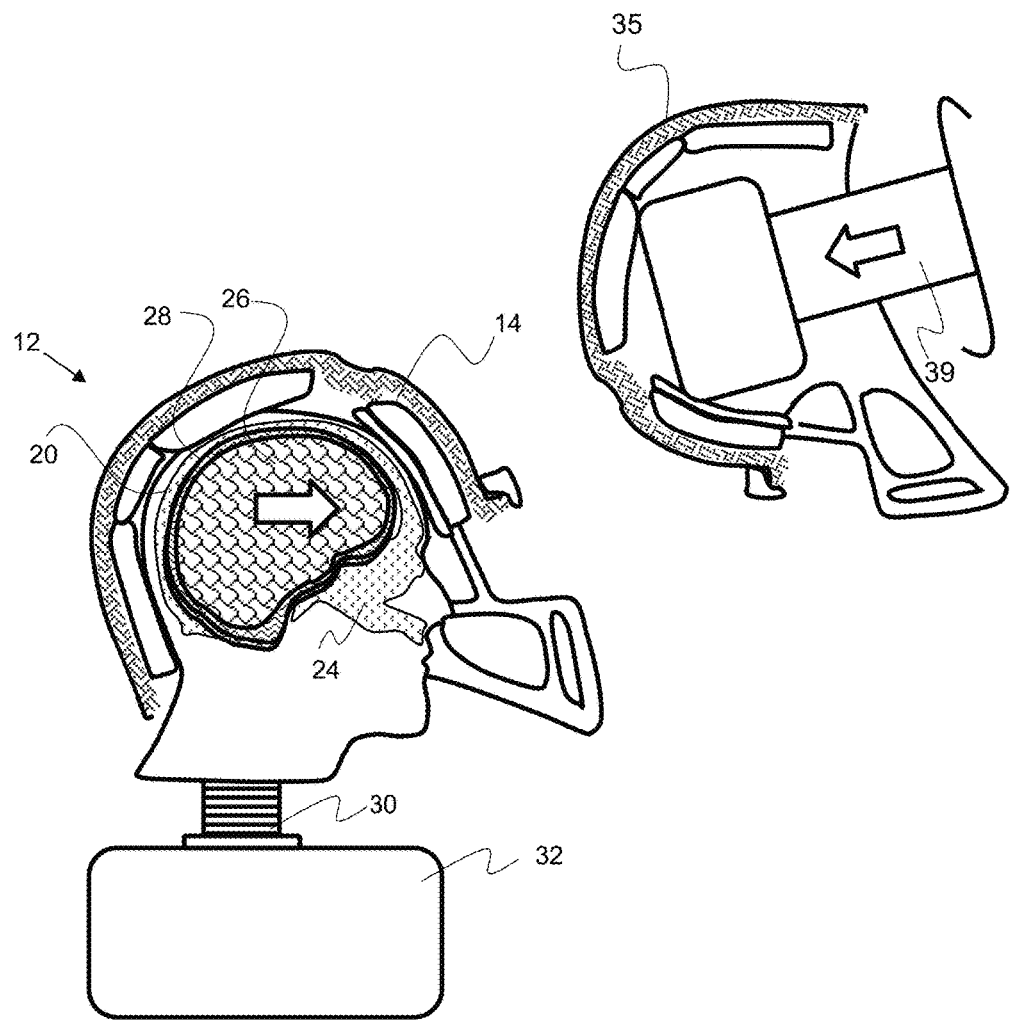
FIG. 13 shows an exemplary head impact simulator with a helmet impact element impacting with a helmet component configured over the head model; in this embodiment, neither the helmet impact element nor the helmet component have a helmet cover.

As shown in FIG. 12, an exemplary head impact simulator 12 is configured with a head model 20 having a helmet component 14 and a helmet cover 15, thereon. A helmet impact element 35 is configured on an actuator 39 to impact the head model 20. The helmet impact element also has a helmet cover 15' configured thereon. This test may be compared with a similar test, as shown in FIG. 13, without helmet covers on the head model and the helmet impact element, to demonstrate the effectiveness of the helmet cover in reducing brain trauma.

Figure 14:
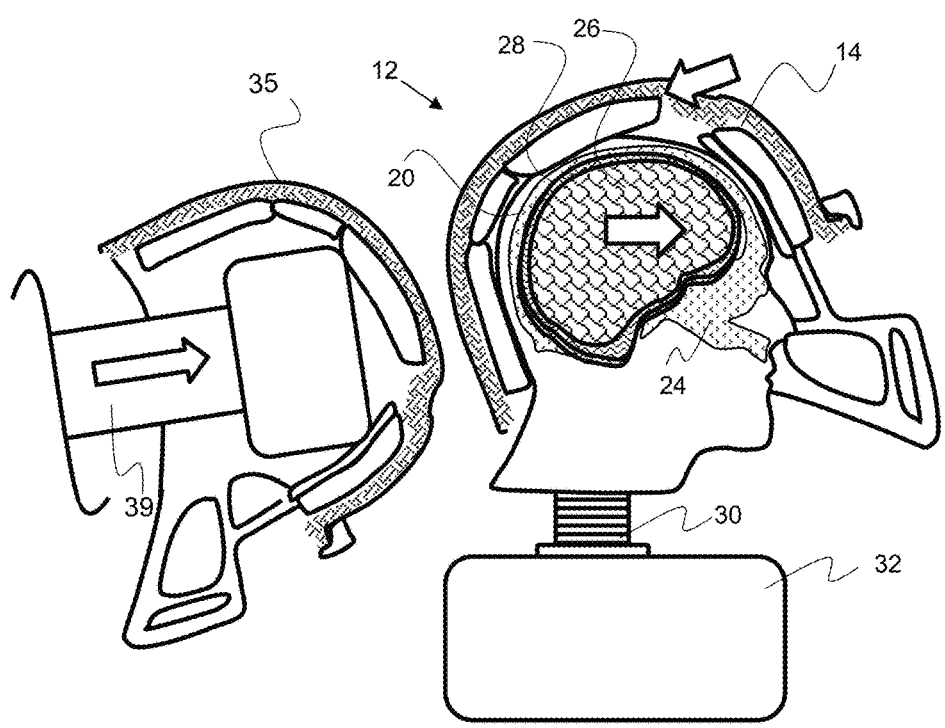
FIG. 14 shows an exemplary head impact simulator with a helmet impact element impacting with a helmet component on the back of the head model; in this embodiment, neither the helmet impact element nor the helmet component have a helmet cover.

As shown in FIG. 14, an exemplary head impact simulator 12 is configured with a head model 20 having a helmet component 14 and a helmet impact element 35. The helmet impact element is configured to provide an impact to the back portion of the head model. Note that the impact element may be configured to strike the head model in a position and with any direction of motion. A impact element may be configured to move and twist the head model as a result of an impact.

It will be apparent to those skilled in the art that various modifications, combinations and variations can be made in the present invention without departing from the spirit or scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. An impact test system comprising:
a head model comprising:
a head exterior component;
a skull component;
a deformable brain component having a similar density to a human brain and being elastic, wherein the deformable brain component is configured to elastically deform;
a fluid component disposed between the deformable brain component and the skull component, wherein the fluid component substantially surrounds the deformable brain component and is in contact with the deformable brain component and the skull component;
an interior cavity; and
a translucent cover;
wherein the head model is coupled with a mount;
wherein the brain component and fluid component are configured within the interior cavity; and
wherein the translucent cover is configured over a portion of the brain component and fluid component;
the mount configured to a least partially restrain the head model;
a camera configured to take a plurality of images of the brain and the fluid components through the translucent cover when the head model is under an impact force; and
a computer and a computer program configured to analyze the plurality of images to determine acceleration of the deformable brain component as a function of the impact force.

2. The impact test system of claim 1, further comprising a neck spring component configured between and coupling together the head model and the mount, wherein the neck spring component is flexible.

3. The impact test system of claim 2, wherein the neck spring component is elastomeric.

4. The impact test system of claim 1, further comprising an impact element configured to provide the impact force.

5. The impact test system of claim 4, wherein the impact element is actuated by an actuator that has a velocity control.

6. The impact test system of claim 4, wherein the impact element is actuated by an actuator that has a stroke control.

7. The impact test system of claim 1, comprising two or more impact elements configured to provide different impacts to head model.

8. The impact test system claim 1, further comprising at least one accelerometer sensor attached to the head model.

9. The impact test system of claim 8, wherein the at least one accelerometer sensor is attached to the skull component or to the brain component.

10. The impact test system of claim 1, further comprising an impact element configured to provide the impact force and at least one accelerometer sensor attached to the impact element.

11. The impact test system of claim 1, wherein the computer and the computer program are configured to analyze the plurality of images to determine deformation of the deformable brain component as a function of an impact to the head model by an impact element.

12. The impact test system of claim 1, wherein the head component is a full head model having a translucent portion.

13. A method of impact testing using the impact test system of claim 1, comprising the steps of:
  actuating an impact element to provide the impact force;
  taking a plurality of images with the camera before, during and after the impact force on the head model; and
  analyzing the plurality of images to determine at least one motion factor of the brain component.

14. The method of claim 13, wherein the at least one motion factor is displacement, velocity or acceleration.

15. The method of claim 14, wherein the analyzing comprises analyzing the plurality of images to determine acceleration of the brain component as a function of an impact to the head model by the impact element.

16. The method of claim 13, wherein the analyzing comprises analyzing the plurality of images to determine deformation of the brain component as a function of an impact to the head model by the impact element.

17. A head model for use in impact testing comprising:
  a head exterior component;
  a skull component;
  a deformable brain component having a similar density to a human brain and being elastic, wherein the deformable brain component is configured to elastically deform;
  a fluid component disposed between the deformable brain component and the skull component, wherein the fluid component substantially surrounds the deformable brain component and is in contact with the deformable brain component and the skull component;
  an interior cavity; and
  a translucent cover;
  wherein the head model is coupled with a mount,
  wherein the brain component and fluid component are configured within the interior cavity, and
  wherein the translucent cover is configured over a portion of the brain component and fluid component.

18. The head model of claim 17, further comprising:
  a mount configured to a least partially restrain the head model; and
  a neck spring component configured between and coupling together the head model and the mount, wherein the neck spring component is flexible.

19. The head model of claim 17, wherein the deformable brain component is viscoelastic.

20. The head model of claim 17, wherein the fluid component has similar viscosity to human cerebrospinal fluid.

21. An impact test system comprising:
  a head model comprising;
    a head exterior component;
    a skull component;
    a deformable brain component having a similar density to a human brain and being elastic, wherein the deformable brain component is configured to elastically deform;
    a fluid component disposed between the deformable brain component and the skull component, wherein the fluid component substantially surrounds the deformable brain component and is in contact with the deformable brain component and the skull component;
    an interior cavity; and
    a translucent cover;
    wherein the head model is coupled with a mount;
    wherein the brain component and fluid component are configured within the interior cavity; and
    wherein the translucent cover is configured over a portion of the brain component and fluid component;
  the mount configured to a least partially restrain the head model;
  a camera configured to take a plurality of images of the brain and the fluid components through the translucent cover when the head model is under an impact force; and
  a computer and a computer program configured to analyze the plurality of images to determine deformation of the deformable brain component as a function of an impact of the head model by the impact element.

22. The head model of claim 17, further comprising a force sensor positioned between the deformable brain component and the skull component.

* * * * *